Nov. 20, 1956 M. F. AFFLERBAUGH 2,771,369
METHOD OF PACKAGING ICE CREAM AND CONTAINER THEREFOR
Filed July 16, 1953

Inventor:
Merle F. Afflerbaugh.
By Fulwider, Mattingly & Babcock.
Attys.

United States Patent Office 2,771,369
Patented Nov. 20, 1956

2,771,369

METHOD OF PACKAGING ICE CREAM AND CONTAINER THEREFOR

Merle F. Afflerbaugh, Newport Beach, Calif.

Application July 16, 1953, Serial No. 368,343

1 Claim. (Cl. 99—180)

My invention relates to the packaging field, and more particularly to a method of packaging and a container in which ice cream is delivered to the customer in an aerated factory-packed condition, but with the aerated ice cream being transformed to the more dense consistency of the hand packed type when the customer performs a simple manual operation on the container.

Ice cream, as is well known, is a frozen solid food made by the churning of cream or a butterfat containing material, in combination with flavoring, sweetening and usually eggs, under refrigerated conditions. Normally ice cream so produced in quantity is highly aerated due to the manufacturing process, and is of a relatively light consistency. Commercially, large quantities of aerated ice cream are daily manufactured and factory packed in containers suitable for distribution to the retail trade, and the containers employed are of a type that may be placed directly within a refrigerated space of the retail store from which the product is sold.

Due to the fact that the factory packed ice cream is at all times maintained in a clean and sanitary condition and is relatively low in cost, the demand for this aerated type of ice cream has increased tremendously within the past few years. However, one of the major disadvantages of highly aerated ice cream is that it readily melts when subjected to a warm temperature for a relatively short time, with the result that the distance it may be carried after purchase is limited. In the past, many ice cream retailers have found it necessary to satisfy public demand to hand pack ice cream inasmuch as it is more resistant to elevated temperatures than the factory packed variety. The hand packed ice cream is also of a more dense consistency and quality which some customers prefer and demand. The cost of the hand-packed product obviously is considerably higher than for a like quantity of the factory packed aerated cream.

Bulk ice cream is received by the retail dealer in relatively large containers, usually five gallon, which are stored in refrigerated compartments. When a customer requests hand packed ice cream, the cream is manually removed from the five gallon container by means of a spatula or scoop and packed in a smaller container of the desired size. Due to the pressure applied to the ice cream in removing it from the five gallon container, the resulting product is of considerably greater density than the aerated factory packed ice cream. The retail ice cream business during recent years has become highly competitive, and many retailers find it unprofitable to carry the two types of product because of lack of refrigerated storage space even though certain customers will not purchase the factory packed product.

The primary purpose in devising my present invention is to provide an ice cream container and method of packaging ice cream which will enable the retailer to sell both the aerated and hand packed product without being required to carry duplicate inventories thereof.

The major object of my invention is to provide a retail ice cream container that is packed with aerated ice cream at the factory, with the structure of the container being such that the purchaser thereof may readily transform the aerated ice cream into the more dense form of the hand packed variety. This transformation is effected by the purchaser by applying manual pressure to a downwardly movable top forming a part of the container.

Another object of my invention is to supply a disposable ice cream container that is attractive in appearance, may be fabricated from standard commercially available sheet materials, and is so inexpensive to fabricate that its cost is substantially the same as any one of the numerous ice cream containers now in use.

A further object of my invention is to supply the retail merchant with a packaged ice cream that permits him to satisfy the market demand for both factory packed and hand packed ice cream at lower cost due to the elimination of duplicate inventories under refrigerated conditions, and the necessity of the time-consuming hand packing of the product for individual sales.

Yet another object of my invention is to provide an ice cream container that will permit retail ice cream establishments to operate on a more profitable basis by eliminating a portion of the refrigerated space now required for the storage of duplicate inventories.

A still further object of my invention is to provide a new and novel method for the packaging of ice cream.

These and other objects and advantages of my method of packaging ice cream, and the container that may be used in carrying out this operation will become apparent from the following description thereof, and from the drawings illustrating the container in which.

Figure 2:
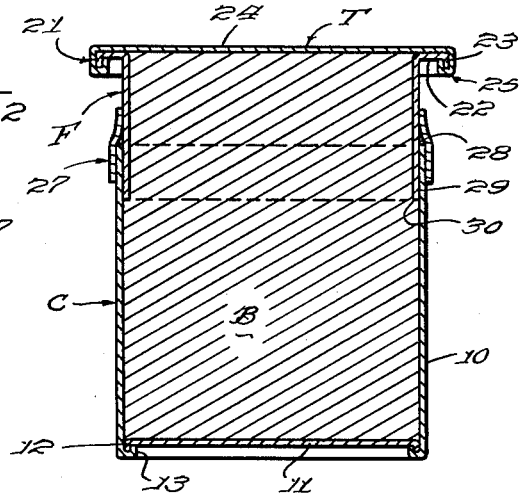
Figure 2 is a vertical cross-sectional view of the device shown in Figure 1, taken on line 2—2 thereof.
Figure 3:
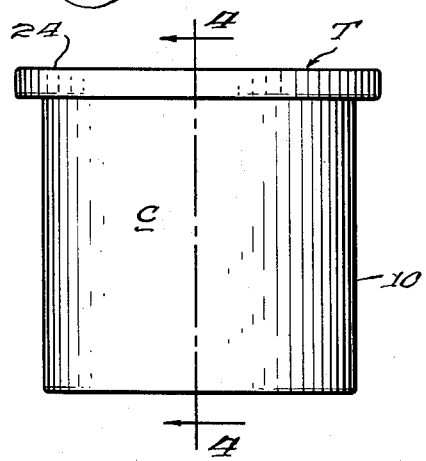
Figure 3 is a side elevational view of my container, after the top thereof has been moved downwardly to compress the aerated ice cream contained therein.
Figure 4:
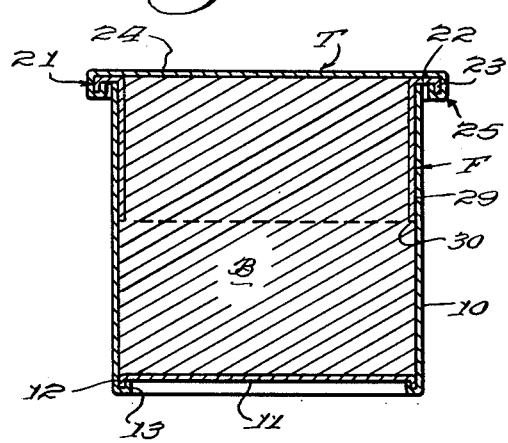
Figure 4 is a vertical cross-sectional view of the container shown in Figure 3, taken on line 4—4 thereof.

Referring now to the drawings for the general arrangement of my invention, it will be seen that it includes a generally cylindrical shaped container C and an annular top T that has a straight-walled flange F which projects downwardly from the circumferential edge portion thereof. Flange F, as may best be seen in Figures 2 and 4, is adapted to slide downwardly within the upper confines of container C.

Container C comprises a cylindrical shell 10 that may be fabricated from an inexpensive sheet material such as a waxed cardboard, or the like. The lower extremity of shell 10 has a bottom 11 disposed therein, which bottom is normally formed from the same sheet material as the shell. Bottom 11 is provided with a downturned circumferentially extending lip 12 that interlocks with an upturned complementary lip 13 formed on the lower edge portion of shell 10. Lips 12 and 13 are crimped, forced or bonded together by conventional means used for such purposes to effect a fluid-tight seal.

It will, of course, be realized that numerous materials such as synthetic plastics or suitable metals may be used in fabricating container C, so long as the material is suitable for holding a dairy product, and has sufficient rigidity that shell 10 will not buckle or deform outwardly to an appreciable extent when moderate pressure is applied to the ice cream contained therein. In addition, the material forming side wall 10 will be such that the flange F may slide freely when in contact with interior surface thereof. The detailed structure of container C may best be seen in Figures 2 and 4.

Flange F is in the form of a cylindrical side wall of such external diameter as to fit snugly, but be slidably movable within the confines of shell 10. The flange F may be formed of the same sheet material as shell 10, but must have sufficient rigidity to withstand moderate downward pressure without appreciably deforming when substantially two-thirds of it projects above the upper edge of shell 10. Flange F has a circumferentially extending lip 21 formed on the upper edge portion thereof. The lip 21 as may best be seen in Figures 2 and 4 has a downturned L-shaped vertical cross-section that includes a flat horizontally disposed leg 22. A short arm 23 depends downwardly from the outer end of leg 22.

An annular pressure plate 24 that may be formed of the same sheet material as shell 10 and side wall F is supported on lip 21. A circumferentially extending lip 25 of J-shaped cross section extends downwardly from the circumferential edge of plate 24 and interlocks with lip 21, as may best be seen in Figures 2 and 4, to hold flange F and plate 24 rigidly together as an integral unit.

With the container C and top T thus fabricated, my invention is ready to be used in merchandising ice cream. A quantity of aerated ice cream B is placed within the confines of container C and top T, to occupy substantially the volume shown in Figure 2. It will be noted that my invention when filled with ice cream to that extent has substantially two-thirds of flange F projecting upwardly above the top edge of container C.

After my container has been filled with aerated ice cream to the extent shown in Figure 2, a sealing strip 27 is caused to encircle container C and flange F to cover the circumferentially extending open junction 28. Junction 28 is the entrance to a very thin annulus-shaped space 29 formed between the exterior surface of flange F and the interior surface of container C. The sealing strip 27 may be formed from any one of the numerous pliable sheet materials available for this purpose, so long as the contacting surface of the strip is firmly held in engagement with the surfaces of the flange F and shell 10. The strip 27 should it be found desirable, may be coated on the interior surface with a pressure sensitive adhesive or other bonding agent that will firmly adhere to the flange F and container C. The sheet material forming strip 27 must have sufficient physical strength to withstand rough handling of my ice cream container, without the strip material deforming or rupturing to permit foreign material to enter the confines of container C through junction 28. In addition, the material from which strip 27 is fabricated should have sufficient tensile strength that the strip may be ripped off my ice cream package as an integral unit when it is desired to open same.

Figure 1:
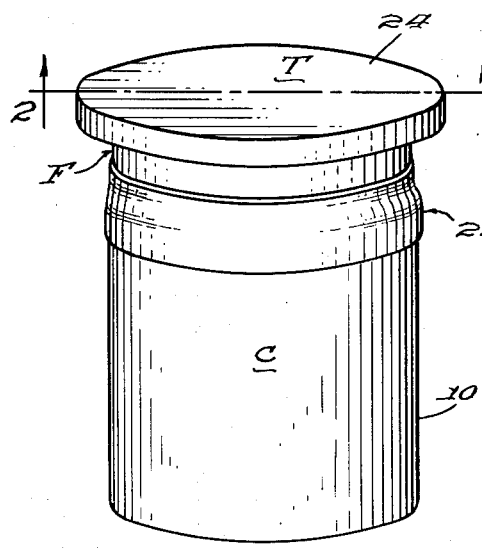
Figure 1 is a perspective view of my container showing the device packed with aerated ice cream.

After container C and top T have been filled with ice cream and the sealing strip 27 applied thereto, the package is ready to be dispatched to a retail outlet for sale to the ultimate purchaser. The particular flavor of the ice cream disposed in the container C is, of course, marked on the outside thereof. After a person has purchased ice cream in a package as shown in Figures 1 and 2, he may use it in either one of two ways. The sealing strip 27 is first removed from the container C and flange F by simply ripping or tearing it therefrom. Should it be desired to use the ice cream B contained in the package in the aerated condition, the top T is simply removed from the container C, with the ice cream then being scooped out of both the top and container. However, if it is desired to have ice cream of substantially the same density as that of the hand packed variety, manual pressure is applied downwardly to the plate 24. As pressure is so applied to plate 24, the top T moves downwardly as an integral unit compressing the ice cream contained in it and container C. The ice cream compresses due to the air contained therein escaping upwardly through the narrow annulus shaped air space 29 that prevails between the slidable contacting surfaces of the flange F and shell 10, with the air completely leaving the container as it emerges at the junction 28. The lower circumferential edge 30 of the flange F serves a dual purpose. Edge 30 due to the slow downward movement of flange F tends to force ice cream B away from the air space 29, but permits air to pass upwardly therethrough. Secondly, the overall area of the edge 30 is of an extremely small magnitude, with the result that the actual pressure exerted by the edge 30 on the ice cream may be far greater than at any other position within the confines of the container C or top T.

Thus, if the ice cream in container C is in a relatively rigid condition due to the low temperature thereof, the specific portion of the ice cream underlying the lower edge 30 of flange F may due to regulation momentarily liquify and permit downward passage of this edge portion of the side wall. Of course, as soon as the ice cream that has momentarily liquified moves to a position where the pressure is at a lower level it again assumes a solidified state. The above described action of the edge 30 of course only takes place when it is acting as the leading edge in pioneering the downward movement of the top T. The flange F has little or no tendency to buckle due to the pressure exerted on plate 24, for the pressure so exerted by the plate on the ice cream is distributed equally in all directions, with the result that pressure is at all times exerted outwardly on the interior face of the flange F to press it in contact with the interior surface of the container C.

The portion of flange F disposed above the container C is subjected to the same internal pressure by the ice cream, but the sheet material forming the flange F has sufficient physical strength to withstand such outward pressure without rupturing. Pressure is manually exerted on the plate 24 until the top T as a whole has moved downwardly in the container C from the position shown in Figure 2 to that occupied by top T in Figure 4 in which the lower surface of arm 22 contacts the upper edge of shell 10. The ice cream situated within the container C as shown in Figure 4 is now fully compacted, and is of substantially the same consistency as hand packed ice cream. The container C as shown in Figure 4 is now opened by conventional means, and the compacted ice cream used in the normal manner.

Although the method of packaging ice cream and the container used in this operation as above described, are fully capable of achieving the objects and providing the advantages hereinbefore mentioned, it is to be understood that they are merely the presently preferred embodiments of my invention, and that I do not mean to be limited to the details of construction or the steps of the method herein described other than as defined by the appended claim.

I claim:

A method of packaging aerated ice cream, which includes: disposing a quantity of aerated ice cream in a first open-mouthed container; disposing another quantity of aerated ice cream in a second open-mouthed container, with said ice cream in said first and second containers abutting against one another in a common contacting face and said containers cooperating to form a unified confined space of normally fixed volume; and said first and second containers when moved inwardly relative to one another, reducing the volume of said confined space to increase the density of said aerated ice cream as a portion of the air is expelled therefrom.

References Cited in the file of this patent

UNITED STATES PATENTS

| | | |
|---|---|---|
| 400,698 | Macomber | Apr. 2, 1889 |
| 1,076,156 | Schierse | Oct. 21, 1913 |
| 1,481,700 | Fatland | Jan. 22, 1924 |
| 1,942,212 | Heseltine | Jan. 2, 1934 |
| 1,988,091 | Schumacher | Jan. 15, 1935 |
| 2,361,984 | Williamson | Nov. 7, 1944 |
| 2,452,174 | Arnold | Oct. 26, 1948 |
| 2,519,271 | Miller | Aug. 15, 1950 |